(12) United States Patent
Stripf et al.

(10) Patent No.: US 7,114,155 B2
(45) Date of Patent: *Sep. 26, 2006

(54) PROGRAMMABLE CONTROLLER

(75) Inventors: Wolfgang Stripf, Karlsruhe (DE); Volker Wendel, Hagenbach (DE)

(73) Assignee: Siemens Aktiengesellschaft, Munich (DE)

( * ) Notice: Subject to any disclaimer, the term of this patent is extended or adjusted under 35 U.S.C. 154(b) by 752 days.

This patent is subject to a terminal disclaimer.

(21) Appl. No.: 09/843,686

(22) Filed: Apr. 30, 2001

(65) Prior Publication Data

US 2001/0025294 A1      Sep. 27, 2001

Related U.S. Application Data

(63) Continuation of application No. 09/101,611, filed on Jul. 17, 1998.

(51) Int. Cl.
*G06F 9/46* (2006.01)

(52) U.S. Cl. ............... 718/100; 719/315; 719/328; 700/5; 700/7; 700/11; 700/18; 700/20; 700/25

(58) Field of Classification Search ........... 718/100, 718/102; 717/1, 5, 6; 700/5, 7, 11, 18, 20; 709/315, 328

See application file for complete search history.

(56) References Cited

U.S. PATENT DOCUMENTS

| | | | |
|---|---|---|---|
| 5,297,257 A | | 3/1994 | Struger et al. |
| 5,485,620 A | | 1/1996 | Sadre et al. |
| 5,610,809 A | | 3/1997 | Morita |
| 5,862,052 A | * | 1/1999 | Nixon et al. ............... 713/1 |
| 5,940,294 A | * | 8/1999 | Dove ........................ 700/83 |
| 5,995,916 A | * | 11/1999 | Nixon et al. ............. 702/182 |
| 6,032,208 A | * | 2/2000 | Nixon et al. ............... 710/64 |
| 6,061,603 A | | 5/2000 | Papadopoulos et al. |
| 6,098,116 A | * | 8/2000 | Nixon et al. ............... 710/8 |

FOREIGN PATENT DOCUMENTS

| | | |
|---|---|---|
| DE | 43 07 413 A1 | 9/1994 |
| EP | 667 693 | 8/1995 |

OTHER PUBLICATIONS

Using Object Oriented Analysis and Design in a Non-Object Oriented Environment Experience report, Kimberley Williams, Rockwell Software, Inc., 1995 IEEE.*

The Situation in Object-Oriented Sepcification and Design, George W. Cherry, 1996 ACM.*

"Mediator: an Intelligent Information System Supporting the Virtual Manufacturing Enterprise," B.R. Gaines et al., 1995 IEEE International Conference on Systems, Man and Cybernetics, Vancouver, Oct. 22-25, 1995, pp. 964-969.

"SIMATIC. Programmable Controllers SIMATIC S7," Catalog ST 70, Siemens, 1995.

"Java and Internet Programming," Van Hoff, Dr. Dobb's Journal, Aug. 1995, vol. 20, No. 8, pp. 56, 58, 60, 61 and 101-102.

"Java!," T. Ritchey, New Riders Publishing, 1995, pp. 14-19.

(Continued)

*Primary Examiner*—Majid Banankhah
(74) *Attorney, Agent, or Firm*—Staas & Halsey LLP (57) ABSTRACT

A programmable controller suitable for use in a globally distributed automation network. In addition, a universal management engineering and information system for such a globally distributed automation network is described. It is used in a globally distributed automation network.

20 Claims, 4 Drawing Sheets

OTHER PUBLICATIONS

"Supporting Microsoft Windows 95," Student Workbook, Course No. 540, Microsoft, Jul. 1995, pp. 120-121.
Allen-Bradley Automation Systems, Dec. 1994, Publication B111, US EI-1.
Enhanced and Ethernet PLC-5 Programmable Controllers, User Manual, Allen-Bradley, Aug. 1994, Publication 1785-6.5.12, US EI-2.
ICOM Software Catalog, 1993, EI-3a.
The Software Connection, Rockwell Software Inc., Nov. 21, 1995, Issue 95.3 EI-3b.
Georg Süss: Generationswechsel bei SPS-Entwicklungssystemen, in: Elektronik 20/1992, XP 000311741, Sep. 29, 1992, p. 110-115, No. 20, München, DE EI-4.
J. Juer and I.P. Hughes: IEC65A Control Languages—A Practical View, Third International Conference on Software Engineering for Real Time Systems, Sep. 16, 1991, p. 139-144, UK EI-5.
Uwe Tempelmann: Objekte mit System, Elektronik 14/1995, Jul. 11, 1995, p. 84-87, DE EI-6.
Werner Achtert: Oldies but Goodies, Elektronik 9/1995, May 2, 1995, p. 108-114, DE EI-7.
Richard Hollenbeck, Affidavit and Exhibits A, B, C, Nov. 8, 2002, US EI-15.
James Gosling, Henry McGilton: "The Java™ Lanuage Environment: A White Paper", Sun Microsystems, NL Nov. 14, 2003, copyright 1995 EI-17.
Henning Behmen: WWW-Projekt HotJava, Objektorientierte Programmiersprache und Web-Viewer, Aug. 17, 1995, DE EI-18.
ISA Chicago, Elektrotechnik für die Automatisierung, Vogel Verlag, Nov. 20, 1996, DE EI-19.
Jane S. Gerold: "What a Tangled Web", Aimax on-line, Jul. 17, 2001, Reprinted from Control Engineering, Nov. 1996 EI-20.
Mark T. Hoske: ISA/96 Chicago: Last of Its Kind Brings Users a Number of Firsts, Control Engineering Online, Sep. 1, 1996 EI-21.
Jane Stoffel Gerold: "New Tools Speed Set Up of Operator Interface Software", Control Engineering Online, Sep. 1, 1996 EI-22.
Zukunft im Netz, Elektronik Praxis 19/1996, Oct. 4, 1996 EI-23.
David L. Ripps: Java for embedded systems in: Java World, Sep. 1996 EI-24.
Matthias Kißmer: Brücke zwischen Welten, Elektro Automation 49/1996, Dec. 13, 1996, p. 27-28 EI-25.
Automatisierungsgerät Modicon A250, Katalog AEG, Oct. 1992, Katalog EII-1.
Objektorientierte Programmierung, Computerlexikon, Beck EDV-Berater, 2$^{nd}$ edition, dtv, 1995 EII-2.

* cited by examiner

FIG. 3

PROGRAMMABLE CONTROLLER

This application is a continuation application of application Ser. No. 09/101,611, filed Jul. 17, 1998, now allowed.

FIELD OF THE INVENTION

The present invention relates to a programmable controller. Furthermore, the present invention relates to a universal, distributed and interconnected automation and management engineering and information system.

BACKGROUND INFORMATION

A programmable controller is described in Siemens Catalog ST 70, 1995. With a programming unit, a user creates a program for controlling an industrial process, including software function blocks, e.g., in the form of organization blocks, program blocks and entity data blocks. The programmable controller is connected to the programming unit by a bus system over which the programming unit transmits the control program to the programmable controller. Furthermore, an operating and monitoring device which is provided for process management can also be connected to the bus system, making it possible to display process images that incorporate multiple image objects.

It is frequently necessary for software function blocks of a control program to be transmitted from a programmable controller of a manufacturing site or from a software pool of this manufacturing site to a programmable controller of another manufacturing site. In particular, when the manufacturing sites are a great distance apart, e.g., because of globalization of manufacturing activities, these software function blocks are transmitted over the Internet, a global network. This requires servers with suitable communications interfaces which permits the use of the Internet communications protocol as well as the communications protocol of the programmable controller. On the basis of these different protocols and the architecture of the programmable controller, it is impossible to tie in the software function blocks while the control program is running, especially when programmable controllers of different manufacturers are to be supplied with these software function blocks.

An object of the present invention is to create a programmable controller which is suitable for use in a globally distributed automation network.

In addition, a universal management engineering system is created in the form of a programming unit and an operating and monitoring device for a globally distributed automation network and also to create a management engineering and information system in the form of workstations and database servers.

DETAILED DESCRIPTION OF THE INVENTION

Figure 1:
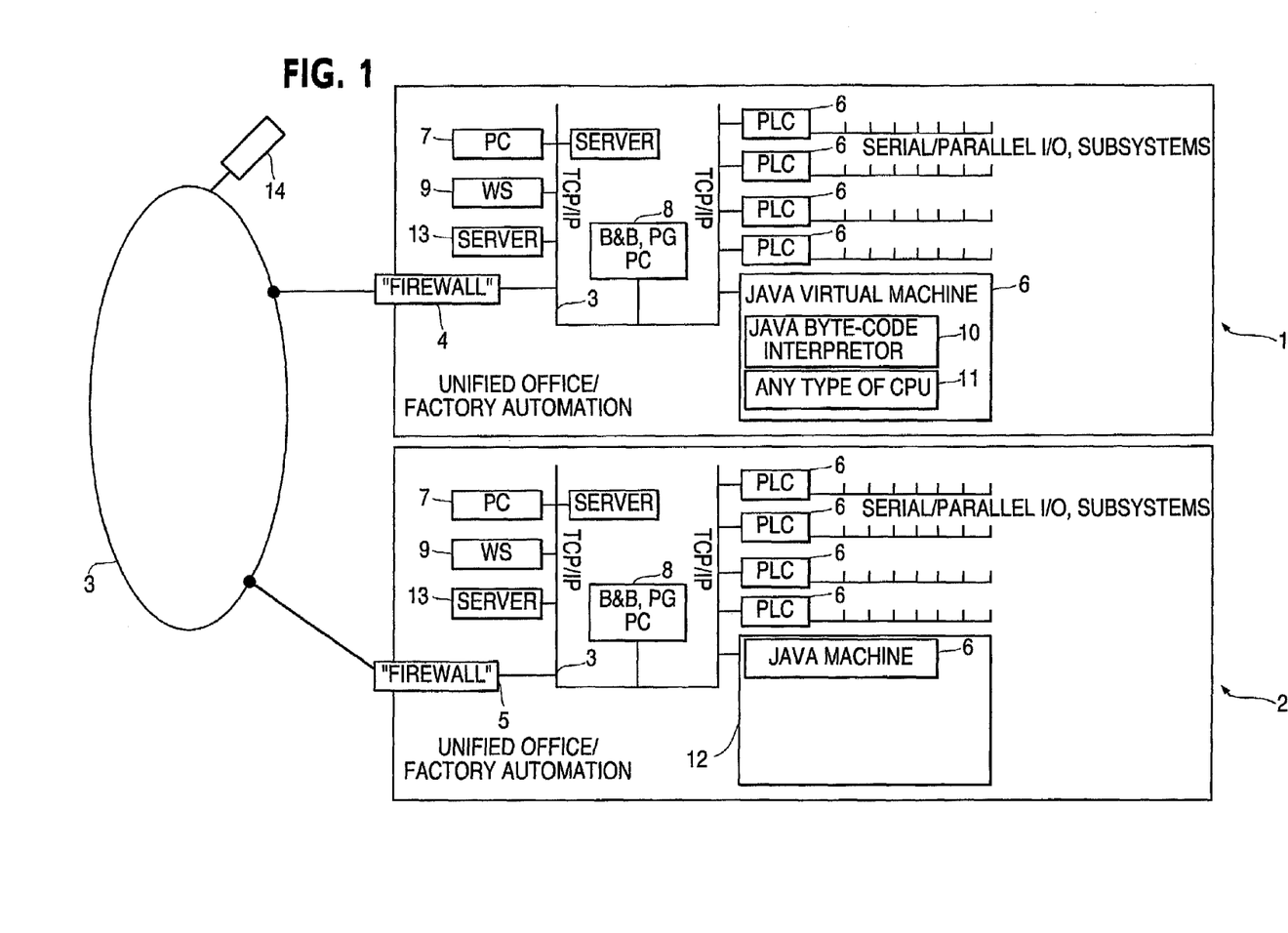
FIG. 1 shows a schematic diagram of a universal, distributed programmable controller and management engineering and information system.

As shown in FIG. 1, two manufacturing sites 1 and 2 of a globally distributed automation network are linked together over a conventional global network, the Internet, with suitable devices 4, 5 provided to prevent unauthorized data from being transmitted into the data processing components of manufacturing sites 1, 2. Manufacturing sites 1, 2 each have a plurality of units in the form of programmable controllers 6, programming units 7, operating and monitoring devices 8 and workstations 9, each of which is provided with an Internet communications interface. These Internet communications interfaces permit TCP/IP protocol communication among the various units. An important requirement of a programmable controller is that a control program formed by multiple software function blocks must be able to run cyclically and/or with interrupt control during control operation. These software function blocks must be designed so that they are loadable and can be tied into the control program while it is running. For this requirement to be met and the software function blocks to be loadable directly into a programmable controller over the Internet and the Internet communications interface, so that they can be tied in to the control program while it is running, the software function blocks have an object-oriented design. The software function blocks are dynamically loadable and expandable over the Internet, and the programmable controller is provided with a software function block execution system (PLC object engine system) that ties these software function blocks into the control program and processes them during control operation.

A programming language which creates an object-oriented code from a source language and is provided for use on the Internet is described in "Java!," T. Ritchey, New Riders Publishing, 1995. This book describes Java C, a source language with which an object-oriented Java byte code can be created. Additional advantageous properties of this process language include in particular the portability of the code and the error-handling mechanisms. The portability of the code ensures than a programmable controller with a execution system in the form of a Java byte code interpreter 10 can process the Java function blocks sent to the programmable controller over the Internet independently of a processor hardware architecture 11 of the programmable controller (regardless of manufacturer). For performance reasons, however, it is advantageous to provide the programmable controller with a Java processor 12 which processes the Java code directly.

Figure 2:
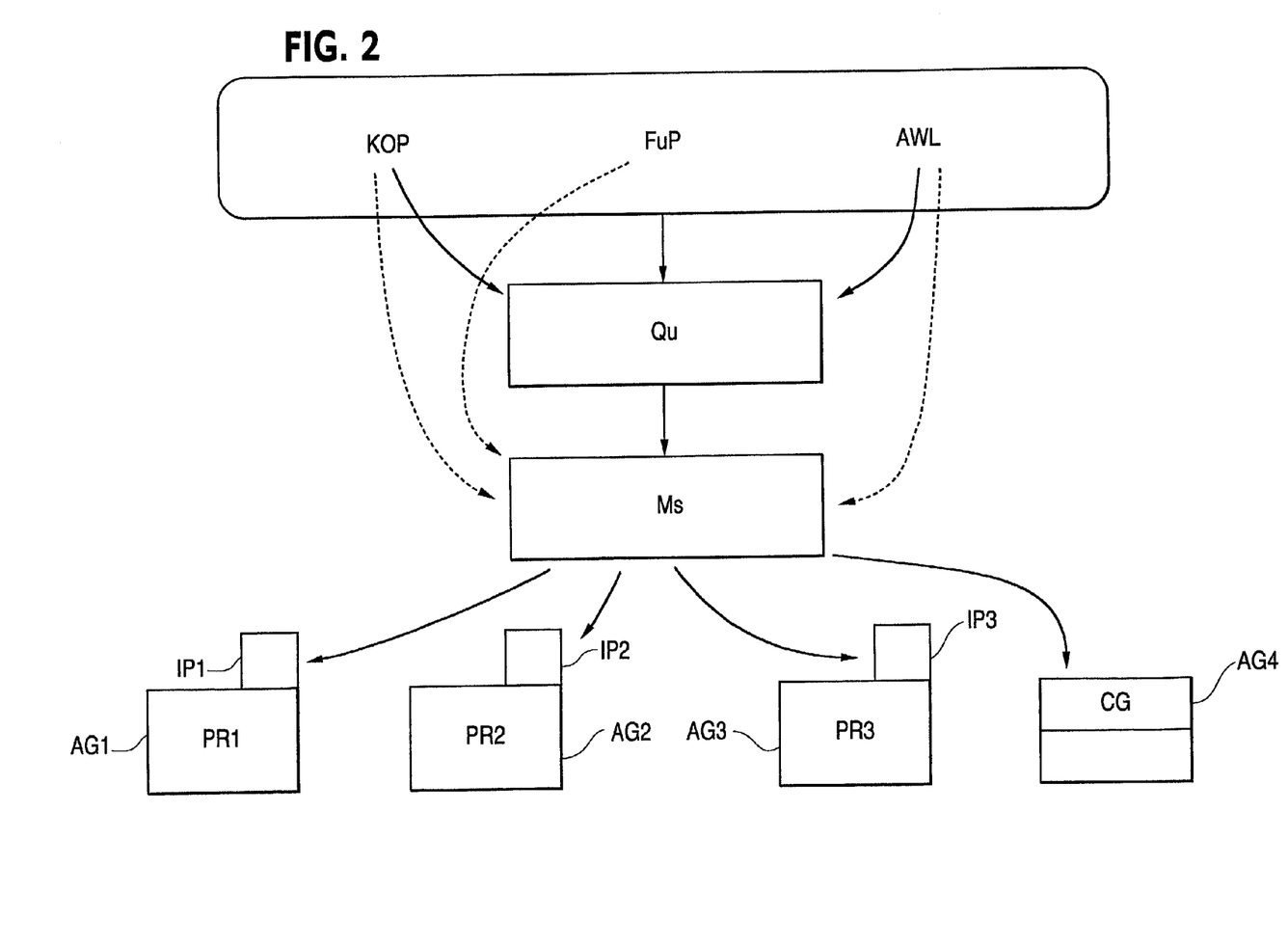
FIG. 2 shows a program translation structure diagram.

The portability of an object-oriented code is illustrated in FIG. 2, which shows a program translation structure diagram.

With a programming unit, a user creates a control program in the form of a contact plan KOP, a function plan FuP, an instruction list AWL or in any other suitable form, such as that described in the IEC 1131 standard, in accordance with a control objective to be achieved. The programming unit translates the control program, on the user level, into a source language Qu, e.g., the source language Java C, or directly (shown with broken lines in FIG. 2) into an object-oriented machine language Ms, e.g., in the Java byte code which is loaded into programmable controllers AG1, AG2, AG3, AG4 of different architectures. On a user level, only one compiler is required for all the programmable controllers to create the machine codes. It is assumed that programmable controller AG4 has a code generator G for processing the machine language Ms, so this programmable controller AG4 can process the code directly. It is also assumed that programmable controllers AG1, AG2, AG3 are not provided with such a code generator, but instead they have different processors PR1, PR2, PR3. In order for programmable controllers AG1, AG2, AG3 to be able to process code, these programmable controllers are each provided with a code interpreter IP1, IP2, IP3. These interpreters IP1, IP2, IP3 each generate a code that can be interpreted by processors PR1, PR2, PR3 while the control program is running.

The object-oriented software function blocks are programmed by the respective programming units 7 (FIG. 1) at manufacturing sites 1, 2 or by a programming unit 14 which is likewise connected to the Internet. In addition to operating and monitoring devices 8 and workstations 9, these programming units 8, 14 are parts of the management engineering system. The programming units send these software blocks to the corresponding programmable controllers over the Internet and the respective Internet communications interface. In the event that blocks must be altered, for example, programmable controller 6 or a server 13 first transmits the corresponding software function block over the Internet to one of programming units 7. Finally, programming unit 7 supplements or modifies this block and can transmit it again to one of the programmable controllers. The programming unit is also provided with a software function block execution system (PLC object engine system; Bos, ExE, Wd, 10) which is provided for simulation of the control program.

The processes to be controlled at manufacturing sites 1, 2 are operated and controlled by the operating and monitoring devices 8 that can be connected to the Internet and operated on the Internet. An operating and monitoring device 8, e.g., operating and monitoring device 8 at manufacturing site 1, creates an operating and monitoring program that encompasses an operating and monitoring software program for creating and displaying a process image containing multiple image objects, where the image objects are in relation to (in interaction with) software function blocks of the control program. The operating and monitoring software blocks are designed to be object-oriented and directly transmittable over the Internet. It is possible to create the process image on programming unit 7 and to send it over the Internet to operating and monitoring software unit 8 for process management.

To reduce the number of input and output components incorporated into a programmable controller in automation systems of a high degree of expansion, distributed subsystems are used, e.g., in the form of intelligent field units. The distributed automation and management engineering system here has an intelligent field unit (not shown) to which at least one software function block of a control program can be sent; the field unit processes the program cyclically and/or with interrupt control during control operation, and the software function block is designed to be loadable and to be tied into the control program while it is running. The software function blocks are designed to be object-oriented arid loadable into a field unit over the Internet and an Internet communications interface of the field unit; the field unit has a software function block execution system (PLC object engine system; Bos, ExE, Wd, IO)) for tie-in of the software function block SF01, . . . , SF04 and processing the control program.

Figure 3:
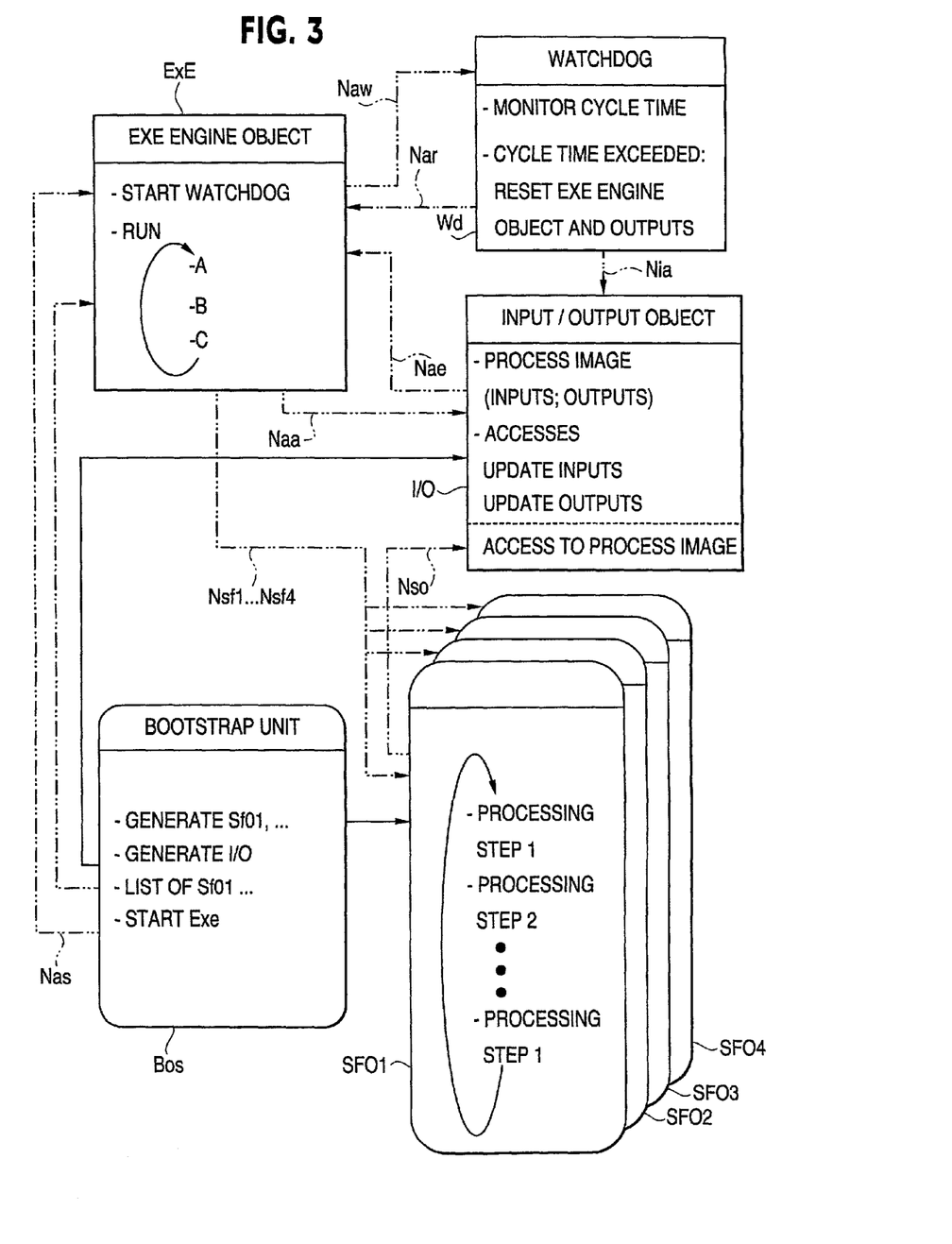
FIG. 3 shows software function block execution systems.
Figure 4:
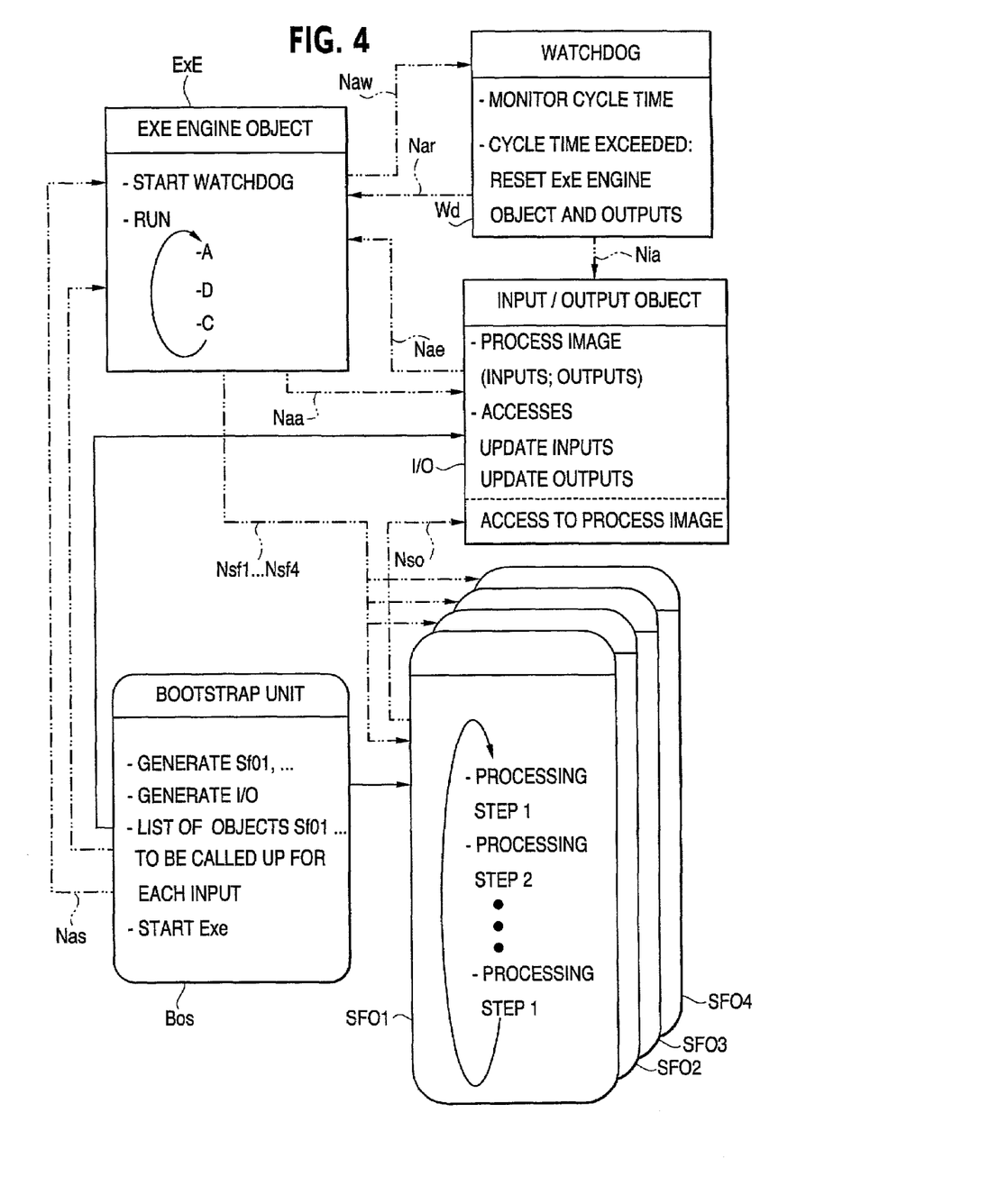
FIG. 4 also shows software function block execution systems.

Reference is now made to FIGS. 3 and 4, which show a software function block execution system (PLC object engine system) of a programmable controller and/or an intelligent field unit and/or a programming unit (for simulation of a control program). It is assumed first that a control program is to be processed cyclically (FIG. 3), i.e., regardless of the signal states of process inputs and outputs of an industrial process to be controlled, for example, the CPU of a programmable controller cyclically a. scans the signal states of the process inputs and deposits them in a process image of the inputs,
b. executes the control program to be processed stepwise according to the requirements of that program, and
c. deposits the calculated signal states in a process image of the outputs, with these signal states going from there to the process outputs.

Essential components of the software function block execution system are object-oriented programmed units in the form of a bootstrap Bos, an input/output module IO, an exe engine object ExE and a watchdog Wd. Watchdog Wd need not be designed as a software module, but may also be implemented in the hardware. In an exemplary embodiment of the present invention, the units exe engine object ExE and watchdog Wd are threads. The operation of a thread is described in "Supporting Microsoft Windows 95," Student Workbook, Microsoft Corp., July 1995 and therefore need not be explained further here. A class of software function blocks and a class of input/output modules are deposited in bootstrap unit Bos. These classes are created by a user, for example, on a programming unit according to the requirements of a control objective to be achieved and are transmitted to a programmable controller, for example, or to a field unit. Before the start of control operation, bootstrap unit Bos creates software function block objects from the class of software function blocks and creates input/output module objects from the class of input/output modules. The present example shows only four software function block objects SF01, . . . , SF04 and one input/output module object IO, in which a process image of inputs and outputs is deposited, to which the signal states of process inputs of the industrial process can be sent, and by which signal states can be sent to process outputs of this industrial process. Furthermore, at the beginning of control operation, bootstrap unit Bos sends exe engine object ExE a list of software function block objects SF01, . . . , SF04 to be processed. At the beginning of control operation, bootstrap unit Bos transmits a message Nas (method call) which starts exe engine object ExE. In a first processing step, exe engine object ExE sends watchdog Wd a message Naw, which causes watchdog Wd to monitor the cycle time of exe engine object ExE. For the case when exe engine object ExE exceeds the intended cycle time, watchdog Wd resets exe engine object ExE by transmitting a message Nar to exe engine object ExE. Furthermore, in the case when the cycle time is exceeded, watchdog Wd resets the outputs of the process image and the process outputs, with watchdog Wd sending a message Nia to input/output module object IO. After exe engine object ExE has started watchdog Wd, exe engine object ExE assumes the control operation and first executes a processing cycle that includes the following steps:

A) Updating the process image inputs by exe engine object ExE reading the input signal states of the process image out of input/output module object IO, with the signal states being exchanged using a method call Nae between the objects,
B) Processing one processing step of the software function block objects SF01, . . . , SF04, with exe engine object ExE sending appropriate method calls NSF1 . . . NSF4 to software function block objects SF01, . . . , SF04, software function block objects SF01, . . . , SF04 access the process image of input/output module object IO via method calls Nso, and finally C) Updating the outputs of the process image, by exe engine object ExE entering the outputs of the process image in input/output module object IO, the signal states being again exchanged using a method call Naa between the objects.

Input/output module object IO supplies the process outputs of the industrial process to be controlled and, as described above, software function block objects SF01, . . . , SF04 with the input and output signal states of the process image over suitable interfaces.

Assuming the case of a control program to be processed with interrupt control (FIG. 4), i.e., in the case of changes in signal states at one of the process inputs of an industrial process to be controlled, suitable control measures must be taken without delay. The same parts in FIGS. 3 and 4 are provided with the same reference notation. Only the differences in comparison with cyclic processing of the control program are described below (FIG. 3). In the case of interrupt-controlled processing of the control program, bootstrap unit Bos does not transmit to exe engine object ExE the list of software function block objects to be processed, as is done in the case of cyclic processing, but instead it transmits a list of software function block objects to be "called" for each process input. Thus, one software function block object is assigned to each process input, and with each change in signal state at a process input, the software function block object assigned to this input is to be started. In contrast with cyclic processing with regard to processing step B), exe engine object ExE executes a step D) during the processing cycle, i.e.:

D). Ascertaining changes in signal state at the inputs of the process image and processing the software function block object assigned to these inputs.

The additional functions to be handled in industrial enterprises such as materials management, production scheduling, personnel use, etc. are combined under the heading of management information systems and are processed by workstations or servers which are also connected to the Internet. They make use of large databases which hold permanent object-oriented software function blocks as representatives of subprocesses and run them on demand.

The software function blocks of the programmable controller and the intelligent field unit are compatible with those in the management engineering system and those in the management engineering and information system with regard to drafting, designing, and programming of automation functions and communication between components of the automation system. Expansion and shifting of functions can thus be accomplished more easily and simply than previously.

The present invention creates an interconnected automation system which permits worldwide operation. This avoids the high degree of decoupling of programmable controllers and standard computers known from the related art, which opens up the possibility of object-oriented modeling of all corporate elements such as processes, resources and organizations. Implementation of software from these object models takes place via a uniform tool chain as part of an interconnected architecture. Simple software adjustments are possible in the process optimization and revision phase by shifting objects. Furthermore, a worldwide, flexible and distributed production with central planning, simulation and optimization are possible.

What is claimed is:

1. Programmable controller to which software function blocks of a control program can be sent, the control program being processed by the programmable controller cyclically and/or with interrupt control during control operation, the software function blocks being designed to be loadable and capable of being tied into the control program while it is running, wherein the software function blocks are designed to be object-oriented to have software function block objects and designed to be loadable into the programmable controller over the Internet and an Internet communication interface of the programmable controller, and the programmable controller has a software function block execution system for tie-in of the software function block objects and for processing the control program.

2. Programmable controller according to claim 1, wherein the software function block execution system includes an exe engine object, a watchdog, a bootstrap and an input/output module object, in which a process image of inputs and outputs can be deposited, and to which signal states can be sent from process inputs and through which signal states can be sent to process outputs, the bootstrap generates the software function block objects and the input/output module object before the start of control operation and sends the following to the exe engine object:

a list of the software function block objects to be processed for the case of cyclic processing of the control program, a list of the software function block objects to be processed for each process input in case of interrupt-controlled processing of the control program, at the start of control operation, the bootstrap the exe engine object, which first starts the watchdog which resets the exe engine object when the cycle time is exceeded, and then cyclically updates the inputs of the process image, processes one processing step of the software function block objects in case of cyclic processing of the control program, ascertains changes in signal states at the inputs in case of interrupt-controlled processing of the control program and processes the software function block objects assigned to these inputs, updates the outputs of the process image.

3. Programmable controller according to claim 2, wherein the exe engine object and the watchdog are designed as threads.

4. Programmable controller according to claim 1, wherein the communication interface permits TCP/IP protocol communication.

5. Programmable controller according to claim 1, wherein the software function blocks are Java-byte-coded and can be created in Java C programming language or in a programming language that complies with the IEC 1131 standard.

6. Programming unit for processing software function blocks of a control program that can be sent to a programmable controller which processes the control program cyclically and/or with interrupt control during control operation, the software function block objects being designed to be loadable and to be capable of being tied into the control program while it is running, wherein the programming unit creates object-oriented software function blocks the programming unit sends the software function blocks to the programmable controller over the Internet and an Internet communication interface of the programming unit, and/or the software function blocks can be sent to the programming unit after the software control block is acted upon, the software function blocks being sent over the Internet and the Internet communication interface.

7. Programming unit according to claim 6, wherein the programming unit has a software function block execution system for simulation of the control program.

8. Programming unit according to claim 6, wherein the communication interface permits TCP/IP protocol communication.

9. Programming unit according to claim 6, wherein the software function block objects can be created in Java C, the programming language which can run on the programming unit, or in a programming language that complies with the IEC 1131 standard, and they can be translated to Java byte code by the programming unit.

10. Operating and monitoring device having operating and monitoring software blocks of an operating and monitoring software program for creating and displaying a process image that includes multiple image objects and is provided for managing a process, the image objects being related to software function blocks of a control program which is processed by a programmable controller during control operation, the operating and monitoring software blocks being designed to be loadable and to be capable of being tied into the operating and monitoring program while it is running, wherein
the operating and monitoring device creates object-oriented operating and monitoring software blocks,
the operating and monitoring software blocks can be transmitted by the operating and monitoring device over the Internet and an Internet communication interface of the operating and monitoring device, and
operating and monitoring software blocks and/or characteristics of the process can be sent to the operating and monitoring device over the Internet and the Internet communication interface, and
the operating and monitoring device has an operating and monitoring software block execution system for processing the operating and monitoring software blocks.

11. Operating and monitoring device according to claim 10, wherein the communication interface permits TCP/IP protocol communication.

12. Operating and monitoring device according to claim 10, wherein the operating and monitoring software blocks can be created in Java C, the programming language which can run on the operating and monitoring device, or in a programming language that complies with the IEC 1131 standard and they can be translated to Java byte code by the operating and monitoring device.

13. Intelligent field unit to which at least one software function block of a control program can be sent, a program being processed by the field unit cyclically and/or with interrupt control during control operation, the software function block being designed to be loadable and to be capable of being tied into the control program while it is running, wherein
the software function blocks are designed to be object-oriented and loadable into the field unit over the Internet and an Internet communication interface, and
the field unit has a software function block execution system for tie-in of the software function block and for processing the control program.

14. Intelligent field unit according to claim 13, wherein the software function block execution system has an exe engine object, a watchdog, a bootstrap and an input/output module object, in which a process image of inputs and outputs can be deposited and to which signal states can be sent from process inputs and through which signal states can be sent to process outputs,
before the start of control operation, the bootstrap generates the software function block objects and the input/output module object and sends the following to the exe engine object:
for the case of cyclic processing of the control program, a list of the software function block objects to be processed,
for the case of interrupt-controlled processing of the control program, a list of the software function block objects to be processed for each process input,
at the start of control operation, the bootstrap starts the exe engine object which first starts the watchdog (Wd), which resets the exe engine object when the cycle time is exceeded, and then cyclically
updates the inputs of the process image,
processes a processing step of the software function block objects for the case of cyclic processing of the control program,
ascertains changes in signal states at the inputs for the case of interrupt-controlled processing of the control program, and processes the software function block objects assigned to these inputs,
updates the outputs of the process image.

15. Intelligent field unit according to claim 14, wherein the exe engine object and the watchdog are designed as threads.

16. Intelligent field unit according to claim 13, wherein the communication interface permits TCP/IP protocol communication.

17. Intelligent field unit according to claim 13, wherein the software function block objects are Java byte coded and can be created in Java C program language or in a program language in compliance with the IEC 1131 standard.

18. Automation system
having at least one programmable controller to which software function blocks of a control program can be sent, the control program being processed by the programmable controller cyclically and/or with interrupt control during control operation, the software function blocks being designed to be loadable and capable of being tied into the control program while it is running, wherein
the software function blocks are designed to be object-oriented to have software function block objects, and designed to be loadable into the programmable controller over the Internet and an Internet communication interface of the programmable controller, and
the programmable controller has a software function block execution system for tie-in of the software function block objects and for processing the control program;
having at least one programming unit for creating software function blocks of a control program that can be sent to a programmable controller which processes the control program cyclically and/or with interrupt control during control operation, the software function block objects being designed to be loadable and to be capable of being tied into the control program while it is running, wherein
the programming unit creates object-oriented software function blocks the programming unit sends the software function blocks to the programmable controller over the Internet and an Internet communication interface of the programming unit, and/or the software function blocks can be sent to the programming unit over the Internet and the Internet communication interface; and having at least one operating and monitoring device having operating and monitoring software blocks of an operating and monitoring software program for creating and displaying a process image that includes multiple image objects and is provided for process management, the image objects being related to software function blocks of a control program which is processed by a programmable controller during control operation, the operating and monitoring software blocks being designed to be loadable and to be capable of being tied into the operating and monitoring program while it is running, wherein the operating and monitoring device creates object-oriented operating and monitoring software blocks, the operating and monitoring software blocks can be transmitted by the operating and monitoring device over the Internet and the Internet communication interface of the operating and monitoring device, and/or operating and monitoring software blocks and/or process quantities can be sent to the operating and monitoring device over the Internet and the Internet communication interface, and the operating and monitoring device has an operating and monitoring software block execution system for processing the operating and monitoring software blocks.

19. Automation system according to claim 18 with at least one intelligent field unit to which at least one software function block of a control program can be sent, the program being processed by the field unit cyclically and/or with interrupt control during control operation, the software function block being designed to be loadable and to be capable of being tied into the control program while it is running, wherein the software function blocks are designed to be object-oriented and loadable into the field unit over the Internet and an Internet communication interface, and the field unit has a software function block execution system for tie-in of the software function block and for processing the control program.

20. Automation network having an automation system having at least one programmable controller to which software function blocks of a control program can be sent, the control program being processed by the programmable controller cyclically and/or with interrupt control during control operation, the software function blocks being designed to be loadable and capable of being tied into the control program while it is running, wherein the software function blocks are designed to be object-oriented and loadable into the programmable controller over the Internet and an Internet communication interface of the programmable controller, and the programmable controller has a software function block execution system for tie-in of the software function block objects and for processing the control program;

having at least one programming unit for creating software function blocks of a control program that can be sent to a programmable controller which processes the control program cyclically and/or with interrupt control during control operation, the software function block objects being designed to be loadable and to be capable of being tied into the control program while it is running, wherein the programming unit creates object-oriented software function blocks, the programming unit sends the software function blocks to the programmable controller over the Internet and an Internet communication interface of the programming unit, and/or the software function blocks can be sent to the programming unit over the Internet and the Internet communication interface;

having at least one operating and monitoring device having operating and monitoring software blocks of an operating and monitoring software program for creating and displaying a process image that includes multiple image objects and is provided for process management, the image objects being related to software function blocks of a control program which is processed by a programmable controller during control operation, the operating and monitoring software blocks being designed to be loadable and to be capable of being tied into the operating and monitoring program while it is running, wherein the operating and monitoring device creates object-oriented operating and monitoring software blocks, the operating and monitoring software blocks can be transmitted by the operating and monitoring device over the Internet and the Internet communication interface of the operating and monitoring device, and/or operating and monitoring software blocks and/or process quantities can be sent to the operating and monitoring device over the Internet and the Internet communication interface, and the operating and monitoring device has an operating and monitoring software block execution system for processing the operating and monitoring software blocks; and having at least one workstation and/or a server which have means for creating and processing object-oriented software function blocks.

* * * * *

UNITED STATES PATENT AND TRADEMARK OFFICE
CERTIFICATE OF CORRECTION

PATENT NO. : 7,114,155 B2  Page 1 of 1
APPLICATION NO. : 09/843686
DATED : September 26, 2006
INVENTOR(S) : Wolfgang Stripf et al.

It is certified that error appears in the above-identified patent and that said Letters Patent is hereby corrected as shown below:

On the cover page:

(56) References Cited, Other Publications, line 4, change "sepcification" --specification--

In the Specification:

Claim 2, col. 6, line 32, after "bootstrap" insert --starts--

Claim 6, col. 6, line 63, after "blocks" insert --,--

Claim 18, col. 8, line 67, after "blocks" insert --,--

Claim 19, col. 9, line 35, after "claim 18" insert --,--

Signed and Sealed this

Sixth Day of March, 2007

JON W. DUDAS
*Director of the United States Patent and Trademark Office*